United States Patent
Connor et al.

[15] 3,692,436
[45] Sept. 19, 1972

[54] THERMAL COMPENSATING SUPPORT FOR TURBOCHARGER SHAFTS

[72] Inventors: Donald H. Connor, Chillicothe; George E. Olson, Lacon, both of Ill.

[73] Assignee: Caterpillar Tractor Co., Peoria, Ill.

[22] Filed: May 20, 1971

[21] Appl. No.: 145,178

[52] U.S. Cl. .................................................. 417/406
[51] Int. Cl. ........................... F04b 17/00, F04b 35/00
[58] Field of Search .............. 417/406, 407, 408, 409

[56] References Cited

UNITED STATES PATENTS 2,701,682  2/1955  Dallenbach et al. ....417/406 X
3,211,362  10/1965  Laskey et al. ...........417/406 X Primary Examiner—Robert M. Walker
Attorney—Fryer, Tjensvold, Feix, Phillips & Lempio

[57] ABSTRACT

A compensating support assembly for a turbocharger having a turbine wheel and compressor wheel interconnected for rotation together by a tubular shaft, a support shaft being supported in cantilevered fashion by two axially spaced apart sets of radially extending pins which are slidably mounted in the turbine housing, anti-friction bearings mounting the tubular shaft on the support shaft, an annular passage for providing lubricant flow across the bearings being formed about the support shaft by the tubular shaft and the two wheels.

5 Claims, 3 Drawing Figures

INVENTORS
DONALD H. CONNOR
GEORGE E. OLSON

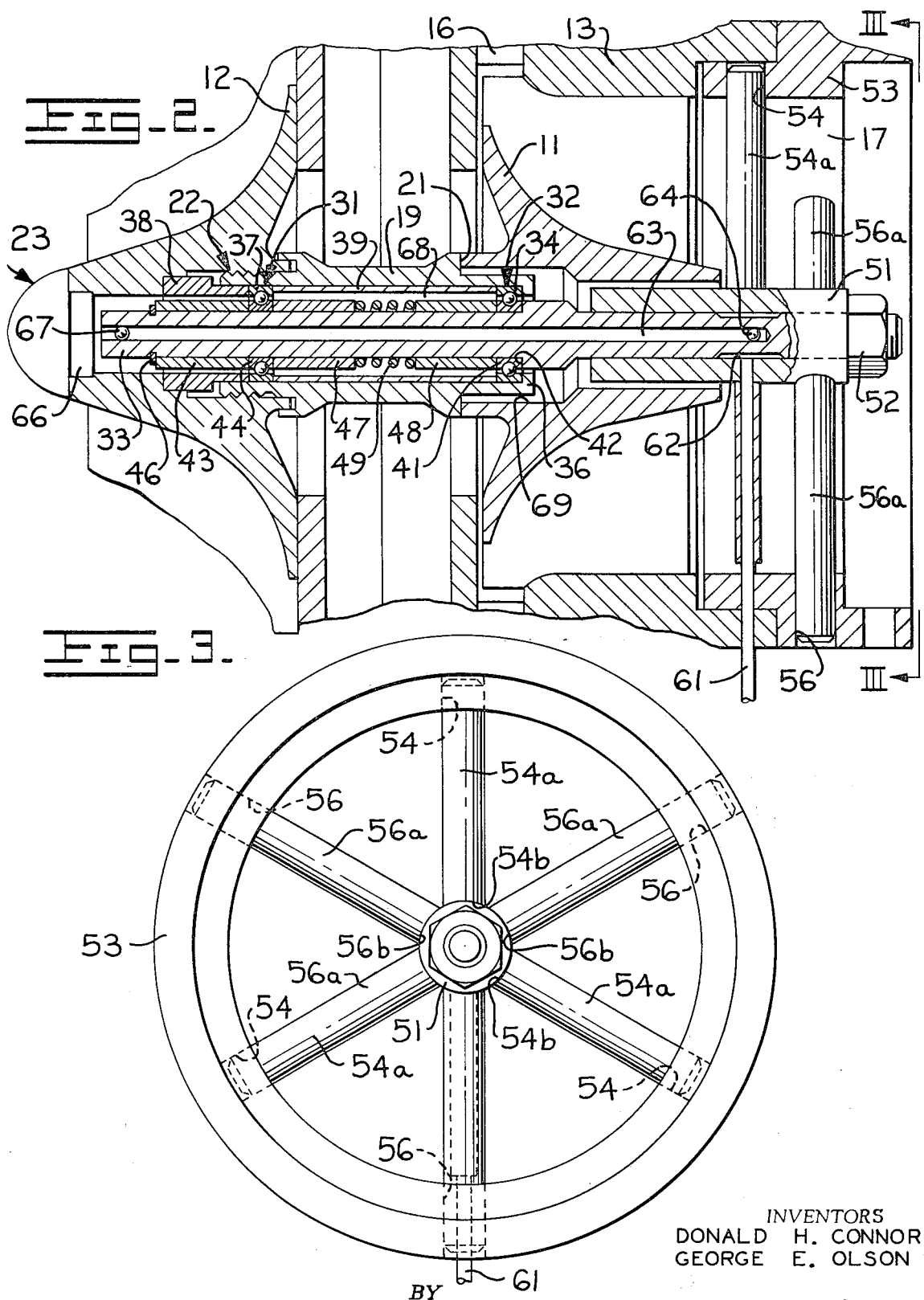

THERMAL COMPENSATING SUPPORT FOR TURBOCHARGER SHAFTS

The present invention relates to a support arrangement for a tubular shaft interconnecting the turbine and compressor wheels of a turbocharger and more particularly to such an arrangement wherein the tubular shaft is mounted by means of anti-friction bearings on a support extending in cantilevered fashion from the turbine housing. The support shaft is mounted on the turbine housing by means compensating for thermal distortion developed in the turbine housing during operation of the turbocharger.

Such an arrangement has numerous advantages in comparison with various prior art support assemblies. The use of anti-friction bearings is particularly desirable because of the improved performance and durability characteristics resulting from reduced friction and less stringent requirements for constant lubrication In most prior art arrangements, a support shaft for mounting the bearings has been supported by both the turbine and compressor housings or cantilevered from the compressor because of relatively limited thermal distortion occurring in the compressor housing due to lower operating temperatures.

By cantilevering the support shaft from the turbine housing and compensating for thermal distortion in the manner of the present invention, the inlet area for the compressor may be increased, thus improving overall performance of the turbocharger while preventing misalignment of the turbine and compressor wheels.

Other objects and advantages of the present invention are made apparent in the following description having reference to the accompanying drawings:

FIG. 2 is an enlarged, axially sectioned view of those exposed components and the assembly for supporting the interconnecting shaft; and FIG. 3 is a view taken along section lines III—III of FIG. 2.

Figure 1:
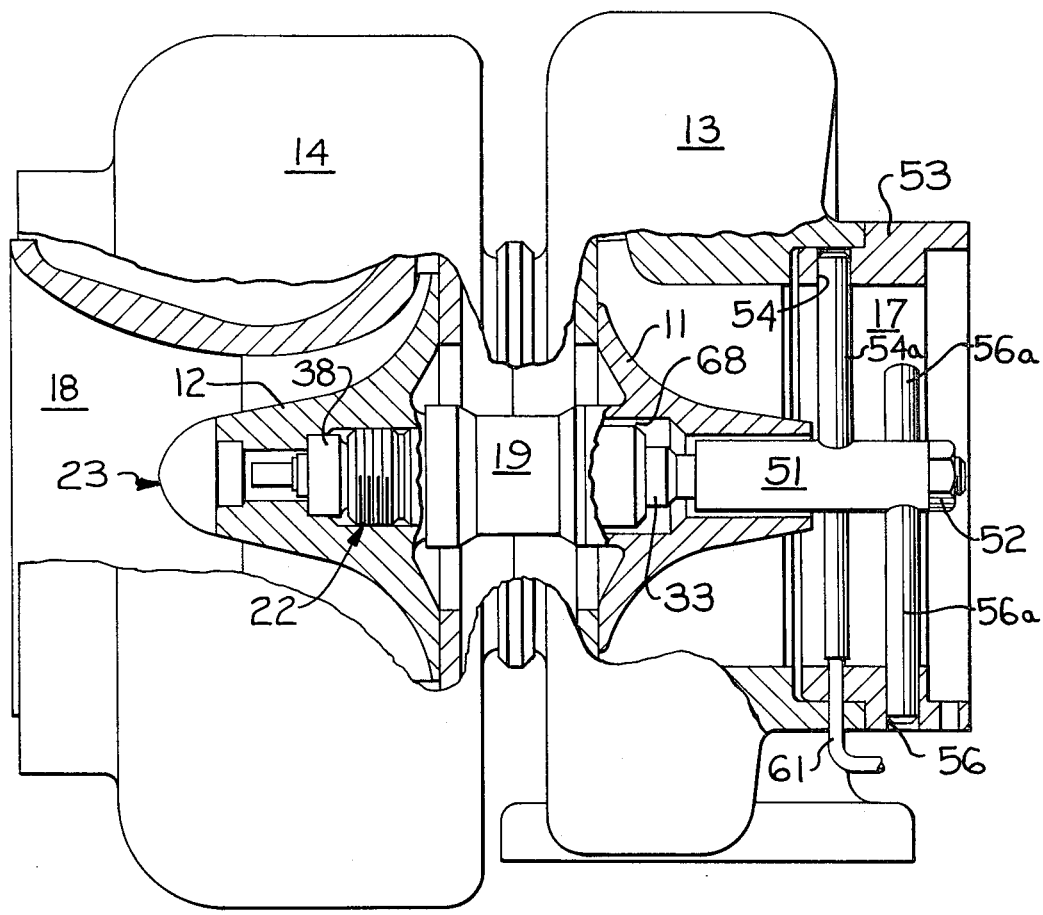
FIG. 1 is a side view of a turbocharger with parts broken away to show the turbine wheel, compressor wheel and interconnecting shaft.

A turbocharger assembly of the type illustrated in FIG. 1 and shown partly in FIG. 2, includes a turbine wheel 11 and compressor wheel 12 respectively arranged for rotation in a turbine housing 13 and compressor housing 14. Referring particularly to FIG. 2, hot exhaust gases enter the turbine housing 13 through axial passages such as that indicated at 16 for driving the turbine wheel 11 in rotation. The hot gases exit the turbine housing by means of an annular discharge passage indicated at 17. Because of the hot gases acting upon the turbine wheel 11, the turbine housing 13 is subjected to high operating temperatures and tends to experience substantial heat distortion.

Referring particularly to FIG. 1, the compressor wheel is operated by the turbine for drawing air through an inlet 18 of the compressor and providing compressed air flow in an otherwise conventional manner. Accordingly, the compressor wheel 12 is coupled for rotation with the turbine wheel 11 by means of a tubular shaft indicated at 19. Referring particularly to FIG. 2, one end 21 of the tubular shaft 19 is secured to the turbine wheel 11 for example by welding with the other end of the tubular shaft being releasably secured to the compressor wheel 12 for example by a threaded coupling indicated at 22.

The support arrangement of the present invention which provides for rotation of the tubular shaft 19 along with the compressor and turbine wheels, also permits the compressor wheel 12 to have a relatively small profile as is generally indicated at 23 for increasing the effective cross-sectional area of the inlet 18 and thereby improving performance of the compressor section.

Accordingly, the tubular shaft 19 is supported in cantilevered fashion from a portion of the turbine housing 11. Means compensating for heat distortion of the turbine housing and thereby maintaining proper alignment of the tubular shaft 19 along with the turbine and compressor wheels are described in greater detail below.

The support assembly is best illustrated in FIG. 2 and includes a pair of anti-friction bearings 31 and 32 which mount the tubular shaft 19 for rotation upon a support shaft 33. The outer race 34 of the bearing 32 is arranged against a shoulder 36 formed by the tubular shaft 19. The outer race 37 of the bearing 31 is arranged between a spacer member 38 acting against the compressor wheel 12 and an annular spacer 39 which abuts the outer race 34 of the other bearing 32.

The inner race 41 of the bearing 32 is similarly arranged against a shoulder 42 formed by the support shaft 33. A spacer member 43 is arranged against an inner race 44 for the bearing 31 and is positioned upon the support shaft 33 by means of a lock ring 46. A pair of annular spacers 47 and 48 together with an interacting spring 49 are arranged between the inner races 41 and 44 of the two bearings.

In order to provide a cantilevered and thermal compensating mounting arrangement for the support shaft 33, an enlarged extension or collar 51 is secured to the support shaft 33 for example by a threaded nut indicated at 52. A portion of the collar 51 which extends past the turbine wheel 11 is co-axially arranged within an adapter member 53 which forms a portion of the turbine housing 13. Referring also to FIG. 3, the adapter member 53 forms two axially spaced apart sets of radially arranged bores, the bores of each set being respectively indicated at 54 and 56. Each set of bores preferably includes three bores which are spaced apart by approximately 120° about the circumference of the adapter member 53 with one set of bores, for example those indicated at 56, being rotated approximately 60° relative to the other set of bores 54. Pins 54a and 56a are each slidably arranged in a respective one of the bores 54 and 56 with the route ends 54b and 56b being integrally secured to the collar 51 so that the collar 51 and support shaft 53 are both axially and radially positioned by slidable engagement of the pins 54a and 56a in the bores 54 and 56.

As heat distortion occurs, for example, during start up of the turbocharger with the turbine housing 13 and adapter member experiencing high operating temperatures, such distortion is compensated for by the pins 54a and 56a sliding somewhat in their respective bores 54 and 56 in order to maintain proper alignment of the support shaft 33, the tubular shaft 19 as well as the compressor wheel 12 and turbine wheel 11.

In order to maintain lubrication of the bearings 31 and 32, a lubricant conduit 61 penetrates the collar 51 for communicating lubricating fluid to an annular passage 62 formed between the collar 51 and the support shaft 33. An axial passage 63 formed along the support shaft 33 is in communication with the annular recess 62 by means of a cross-drilled passage 64. The other end of the support shaft 33 extends into a closed bore 66 with which the axial passage 63 is in communication by means of another cross-drilled passage 67. Lubricating fluid from the bore 66 is communicated across the two bearings 31 and 32 by means of an annular passage 68 formed about the support shaft 33 by means of the compressor wheel, the tubular support shaft 19 and a bore 69 in the turbine wheel with the lubricant than being exhausted into the discharge passage 17 of the turbine.

What is claimed is:

1. A compensating support assembly for a tubular shaft interconnecting a turbine wheel and compressor wheel within chambers respectively formed by axially aligned turbine and compressor housings, comprising
   a portion of the turbine housing forming two axially spaced apart sets of radially arranged bores,
   a support shaft having radially extending pins secured thereto, each of the pins being slidably arranged in a separate one of the bores, the support shaft axially penetrating the turbine wheel and extending in cantilevered fashion toward the compressor wheel in coaxial relation with the tubular shaft,
   anti-friction bearings being arranged between the support shaft and tubular shaft to permit rotation of the tubular shaft, the turbine wheel and the compressor wheel about the support shaft, spacer means being arranged for maintaining axial alignment of the bearings and tubular shaft upon the support shaft.

2. The support assembly of claim 1 wherein the two sets of bores are angularly offset with relation to each other.

3. The support assembly of claim 2 wherein one set of bores comprises three bores spaced approximately 120° apart, the other set comprising three bores also spaced approximately 120° apart and angularly displaced approximately 60° with respect to the first set of bores.

4. The support assembly of claim 1 wherein the support shaft extends into a closed bore formed by the compressor wheel, the support shaft having an axially extending passage, means arranged at the turbine end of the support shaft for introducing lubricant through the axial passage to the closed bore, the compressor wheel, tubular shaft and turbine wheel forming an annular passage about the support shaft for directing the lubricant from the closed bore across the bearings and into a discharge passage in the turbine housing.

5. The support assembly of claim 1 wherein the radially arranged bores are formed by an adapter member secured to the turbine housing, the support shaft having an enlarged extension to which the pins are secured.

* * * * *